US010717501B1

(12) United States Patent
    Gilhooley

(10) Patent No.: US 10,717,501 B1
(45) Date of Patent: Jul. 21, 2020

(54) CAMERA MOUNT FOR A PERSONAL WATERCRAFT

(71) Applicant: Sean Patrick Gilhooley, Deerfield Beach, FL (US)

(72) Inventor: Sean Patrick Gilhooley, Deerfield Beach, FL (US)

( * ) Notice: Subject to any disclaimer, the term of this patent is extended or adjusted under 35 U.S.C. 154(b) by 0 days.

(21) Appl. No.: 16/539,670

(22) Filed: Aug. 13, 2019

(51) Int. Cl.
    *B63B 32/70* (2020.01)
    *G03B 17/56* (2006.01)
    *B63B 32/20* (2020.01)

(52) U.S. Cl.
    CPC .............. *B63B 32/70* (2020.02); *B63B 32/20* (2020.02); *G03B 17/561* (2013.01)

(58) Field of Classification Search
    CPC ............................ B63B 35/85; G03B 17/561
    See application file for complete search history.

(56) References Cited

U.S. PATENT DOCUMENTS

| | | | |
|---|---|---|---|
| 4,927,109 A * | 5/1990 | Wilson ..................... | B63B 17/02 248/188.9 |
| 5,173,725 A | 12/1992 | Giles et al. | |
| 7,744,046 B1 * | 6/2010 | Lundy ..................... | B60R 11/02 248/121 |
| 8,137,008 B1 | 3/2012 | Mallano | |
| 8,783,205 B1 | 7/2014 | Kocher | |
| 9,517,818 B2 | 12/2016 | Gasparro | |
| 9,527,457 B2 | 12/2016 | Gasparro | |
| 10,066,786 B1 | 9/2018 | Cox | |
| 2001/0006037 A1 * | 7/2001 | Badley ................... | B63B 35/816 114/253 |
| 2014/0144365 A1 | 5/2014 | Isaac | |
| 2014/0199859 A1 * | 7/2014 | Jordan .................... | B60R 11/00 439/34 |
| 2015/0000586 A1 | 1/2015 | Vargo et al. | |
| 2016/0037762 A1 | 2/2016 | Thomas | |
| 2016/0244129 A1 | 6/2016 | Cromartie | |
| 2018/0127068 A1 | 5/2018 | Rohrer | |

OTHER PUBLICATIONS

Hammack, Greg, "DIY GoPro Jetski Dual Camera Mount", https://imgur.com/gallery/J2wJg, Dec. 22, 2015, pp. 1-7.

* cited by examiner

*Primary Examiner* — Noam Reisner
(74) *Attorney, Agent, or Firm* — The Concept Law Group, PA; Scott D. Smiley; Scott M. Garrett

(57) ABSTRACT

A camera mount for a personal watercraft includes an elongated member that couples to a base mounted on the rear of the personal watercraft, behind the seat of the personal watercraft. The coupling point at the base allows the elongated member to pivot so that the top of the elongated member can move forward or rearward. The elongated member can be height-adjustable to raise or lower the camera attachment at the top of the elongated member. An extension arm rigidly couples the elongated member to the seat handle behind the seat of the personal watercraft to prevent the elongated member from shifting position while operating the personal watercraft.

20 Claims, 11 Drawing Sheets

CAMERA MOUNT FOR A PERSONAL WATERCRAFT

FIELD OF THE INVENTION

The present invention relates generally to camera mounts, and more particularly to camera mounts adapted for use on personal watercraft.

BACKGROUND OF THE INVENTION

In the last decade there have been several developments that have given rise to the popularity of video cameras. One is the advances in digital camera technology and digital solid state media that allow for small cameras. This is evident in the fact that virtually every cellular telephone device contains a camera capable of recording video. Another development has been the popularity of media sharing internet platforms such as YOUTUBE and FACEBOOK. Such platforms have enabled people to make a living by creating video content and sharing it on these platforms. As such, there is an increasing demand for accessories and tools to help create video content for both personal use as well as for monetization.

In creating video content, it is common to attach a camera to something so that the camera can record without having to be held by a person. There are various camera stands and mounts available on the market to accomplish this, however they tend to either be general purpose mounts designed to clamp onto something rigid and fixed, or body-worn mounts that record from a "point of view" angle. However, the wide angle design of common video cameras, such as those sold under the trade name GO PRO, tend to result in a video where the near features in the view are substantially prominent, and the actual view that is of interest is less prominent. Typically the near features include the structure to which the camera is mounted, or the structure in front of the person on which the camera is mounted. For example, in creating a video recording from the point of view of a motorcycle rider, if the camera is on a body-worn mount, then the controls and instruments of the motorcycle will be prominent in the resulting video, and the view ahead of the motorcycle will be less prominent, which, if the viewer is interested in the view ahead of the motorcycle, is not a desirable viewpoint. To alleviate this problem, helmet mounts have been developed to place the camera higher up, on the riders head. This location can improve the view ahead of the motorcycle, but being on the helmet, is subject to the rider turning their head.

Similarly, with personal watercraft, a body-worn camera mount produces a video from a low angle that, due to the wide angle design of typical sport video cameras on the market, makes the controls of the personal watercraft very prominent in the video recordings created this angle, and the video is subject to the movement of the wearer of the camera. The view of the seascape/landscape in front of the personal watercraft is essentially secondary in prominence, although it is the view that is of most interest.

Therefore, a need exists to overcome the problems with the prior art as discussed above.

SUMMARY OF THE INVENTION

The invention provides a camera mount system for a personal watercraft that overcomes the hereinafore-mentioned disadvantages of the heretofore-known devices and methods of this general type and that allows a camera to be positioned at the rear of the personal watercraft, above a head level of the rider(s) while the rider is sitting on the seat of the personal watercraft in order to record a view that is more interesting and desirable to watch than, for example, a body-mounted camera worn by the rider.

In accordance with some embodiments of the inventive disclosure, there is provided a camera mount system for a personal watercraft that includes a main body including an elongated member having a length of at least three feet, and further having a top end and a bottom end wherein the top end is configured to receive a camera attachment. The camera mount system further includes a base having a flat bottom surface configured to adhere to a deck surface of the personal watercraft, and further having a top that is configured to couple to the bottom end of the elongated member of the main body in a way that allows rotation of the elongated member about a coupling point between the base and the elongated member. The camera mount system can further include an extension arm that extends from the main body having a distal end, the distal end having an attachment configured to attach to a rear seat handle of the personal water craft.

In accordance with another feature, the elongated member comprises an upper section and a lower section that move relative to each other in a telescoping manner, and which includes a holding feature to hold the upper and lower sections in place at a selected length of the main body.

In accordance with another feature, wherein the holding feature comprises a compression collar.

In accordance with another feature, the holding feature comprises sprung peg that extends through openings in both the upper and lower sections and which can be compressed against a spring that urges the sprung peg outward to move the upper and lower sections relative to each other.

In accordance with another feature, the length of the main body is adjustable to increase the length by at least four inches.

In accordance with another feature, wherein the attachment at the distal end of the extension arm comprises a clamp.

In accordance with another feature, the attachment at the distal end of the extension arm comprises a hook and loop fastener strap.

In accordance with another feature, the extension arm is adjustable in length.

In accordance with another feature, the top of the base comprises at least two attachment points to couple the top to the bottom of the elongated member.

In accordance with another feature, the top end of the main body is further configured to adjust an angle of the camera attachment.

In accordance with other embodiments of the inventive disclosure, there is provided a camera mount system for a personal watercraft that includes a main body having a top end and a bottom end. The top end is configured to receive a camera attachment, and the main body being an elongated structure including two telescoping members that can be moved relative to each other and locked into position at a selected length. The camera mount system can further include a base having a bottom surface configured to interface with a deck surface of the personal watercraft, and having a top that is configured to couple to the bottom end of the main body in a way that allows rotation of the main body about a coupling point between the base and the elongated member. The camera mount system can further include an extension arm that extends from the main body at a proximate end of the extension arm, the extension arm having a distal end having an attachment configured to attach to a portion of the personal water craft, and wherein the extension arm is length adjustable.

In accordance with another feature, the main body includes an upper section and a lower section that move relative to each other, and a holding feature to hold the upper and lower sections in place at the selected length of the main body.

In accordance with another feature, the holding feature comprises a compression collar.

In accordance with another feature, the holding feature comprises sprung peg that extends through openings in both the upper and lower sections and which can be compressed against a spring that urges the sprung peg outward to move the upper and lower sections relative to each other.

In accordance with another feature, the length of the main body is adjustable to vary a length of the main body by at least four inches.

In accordance with another feature, the attachment at the distal end of the extension arm comprises a clamp.

In accordance with another feature, the attachment at the distal end of the extension arm comprises a hook and loop fastener strap.

In accordance with another feature, the extension arm is adjustable in length by at least two inches between a minimum fixed length and a maximum fixed length.

In accordance with another feature, the bottom of the main body couples to the base at a retention portion that is pivotably mounted between two protrusion that extend upward from a top surface of the base, and wherein the retention member includes retention portions extending from a top of the retention portion downward along a side of the retention portion, and wherein the retention members are cantilevered and include a transverse extension that extends outward horizontally and a ramp portion between the transverse extension and the top of the retention portion, and wherein upon placing the bottom end of the main body over the retention portion, an inside surface of the main body compresses the retention members inward by interference with the ramp portion of each retention member, unit a respective opening in the bottom end of the main body is aligned with the ramp portions thereby allowing the retention members to displace outward, and wherein the transverse extensions prevent the bottom end of the main body from traveling further downward, and wherein the retention members are configured to allow removal of the main body from the retention portion by compressing the transverse extensions inward to compress the retention members such that the ramp portions are clear of the openings in the bottom end of the main body.

In accordance with another feature, the top end of the main body is further configured to adjust an angle of the camera attachment.

Although the invention is illustrated and described herein as embodied in a camera mount system for a personal watercraft, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the main body or the extension arm. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
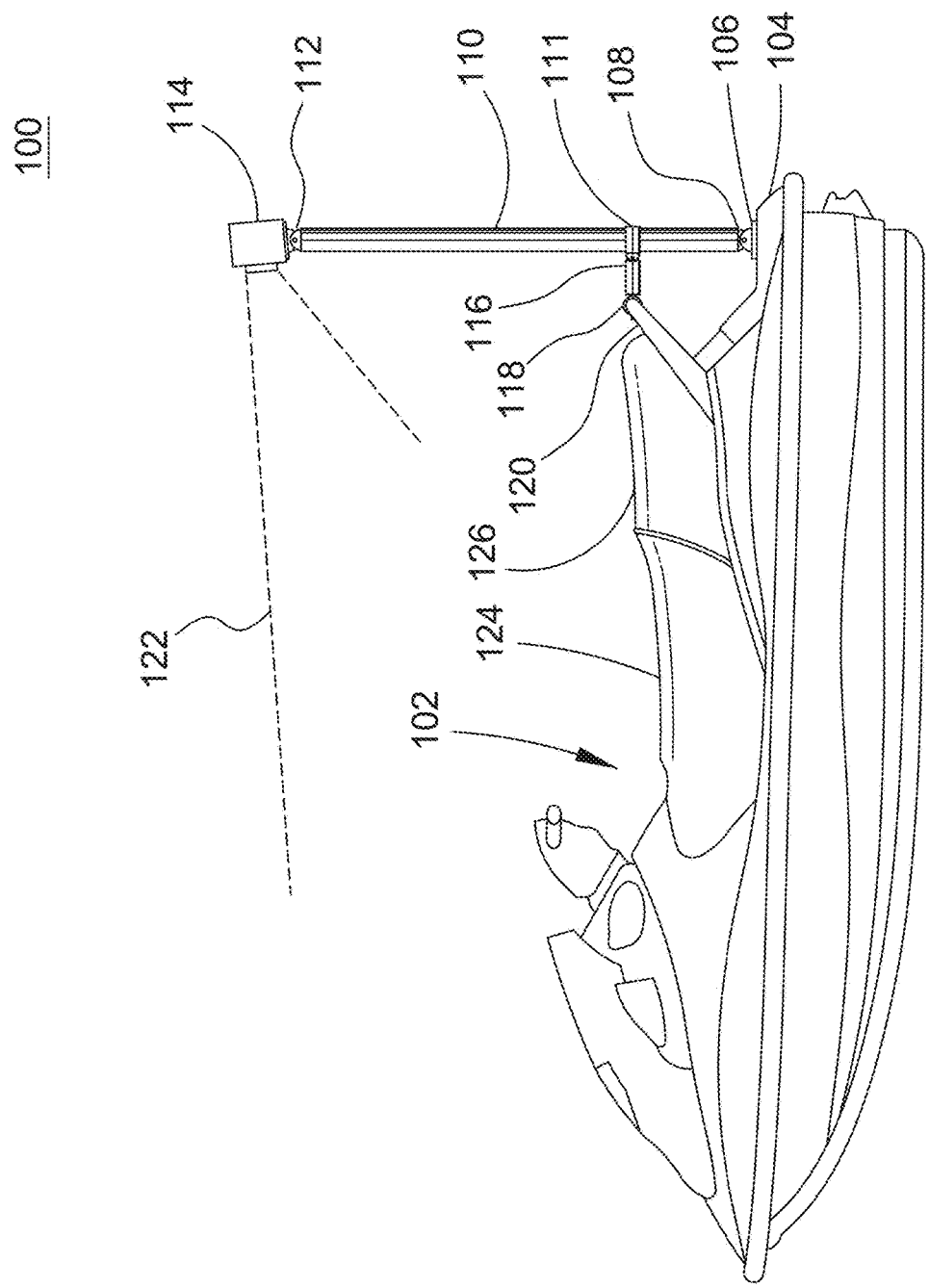
FIG. 1 is a side elevational view of a personal water craft and a camera mount system for the personal water craft, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 is a side elevational view of a camera mount system 100 for a personal water craft 102, in accordance with some embodiments. The personal watercraft 102 is an example of any of the numerous personal watercraft sold and available in the market, and is generally designed to carry one, two, or sometimes three people. Generally such personal watercraft include a seat that can have a front portion 124 for a driver or operator of the personal watercraft 102, and the seat can include a rear portion 126 configured for a passenger. A rear seat handle 120 is connected to the body of the personal watercraft on either side of the seat, and extends to the rear, and behind the rear portion 126. The seat handle is configured to allow a passenger in the rear portion 126 of the seat to hold onto the rear seat handle 120 in order to stay on the seat. Behind the seat is aft deck 104 which extends to the rear of the seat, and is generally configured to allow users of the personal watercraft 102 to step onto the top surface of the aft deck in order to get onto the personal watercraft 102.

A camera mount is mounted on the personal watercraft behind the seat and elevates a camera 114 over the head or heads of the driver/operator and passenger, allowing a field of view 122 that can include a rear view of the riders, the front portion of the personal watercraft 102, but more importantly, the field of view 122 includes a wider view of the seascape/landscape in front of the personal watercraft than can be produced by a body worn camera on the driver/operator, or a handlebar mounted camera on the front of the personal watercraft 102. Videos created using the disclosed inventive camera mount have been favored over those created using conventional mounts (i.e. body-worn or front mounted) by viewers. The low angle of body-worn and front mounted cameras results in a view that reduces the visual prominence of the personal watercraft and increases the visual prominence of the view in front of the personal watercraft, while also including a view of the driver/operator. Further, because, as will be discussed, the camera mount is attached to the personal watercraft, rather than being mounted in a body-worn configuration, the view 122 remains consistent.

The mount of the inventive disclosure include a base 106 that is fixedly mounted on the top surface of the aft deck 104. The base 106 is configured to couple to the main body of the camera mount at a bottom 108 of an elongated member 110 of the main body, and the elongated member 110 has a top at which a camera attachment 112 is located. The camera attachment 112 is configured to attach to a camera 114 and hold the camera at the top is a rigid manner, although the camera attachment 112 can be adjustable to allow the camera 114 to be aimed or angle in a desired direction. An extension arm 116 is coupled to the elongated member 110 of the main body at a proximate end of the extension arm, and the distal end of the extension arm includes an attachment 118 configured to attach to the rear seat handle 120 of the personal water craft 102. In some embodiments a collar 111 can encircle and fit over the elongated member 110, in order to couple to the extension arm 116, and allow vertical adjustment of the attachment point of the extension arm 116 to the elongated member 110. The attachment 118 can be a strap or a clamp, or any other structure capable of rigidly attaching to the rear seat handle 120. Thus, the extension arm 116, by being coupled to the fixed rear seat handle 120 by attachment 118, stabilizes the elongated member 110 of the main body, preventing the elongated member 110, and therefore the camera 114, from moving forward or rearward, and also adds side to side stability.

In some embodiments the elongated member 110 is height adjustable, having a minimum height of about three feet and a maximum height of about five feet. Likewise, the extension arm 116 can be length-adjustable to accommodate the different dimensions and configuration of personal watercraft and allow the operator to adjust the position (front to back) of the camera 114 relative to the personal watercraft 102. In some embodiments the elongated member 110 and extension arm can be made of rigid tubing, either circular or square tubing, and can have telescoping sections that can be adjusted and then fixed in place relative to each other.

Figure 2:
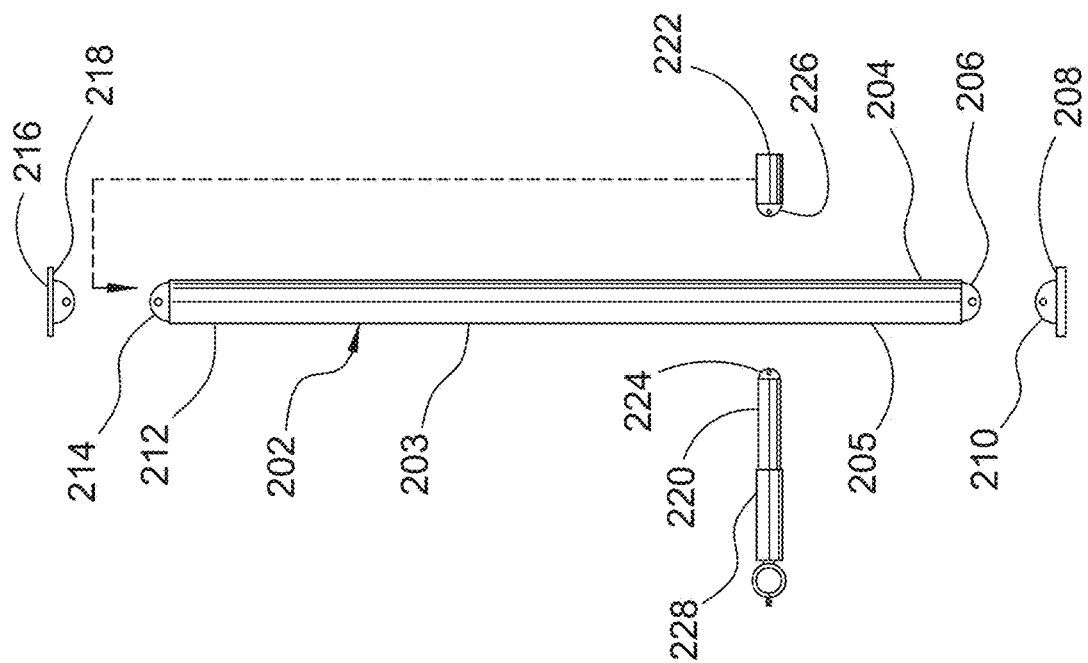
FIG. 2 is an exploded side view of a camera mount system for a personal water craft, in accordance with some embodiments.

FIG. 2 is a partially exploded side view of a camera mount system 200 for a personal water craft, in accordance with some embodiments. A main body 202 can include an upper section 203 and a lower section 205 that are movable with respect to each other (e.g. telescoping) to allow the overall length of the main body 202 to be height adjustable when installed on a personal watercraft as intended. The bottom 204 of the main body 202 includes a base attachment feature 206 for attaching to a base 208. The base attachment feature 206 can be a flat semi-circular member that protrudes from, and below the bottom 204 such that a plane defined by the flat semi-circular member is oriented along an axis of the main body 202. The flat semi-circular member can fit between two corresponding semi-circular members of a mating attachment feature 210 on the base 208. Transverse holes through the semi-circular members can receiver a bolt to hold them together and allow the main body 202 to pivot about the base 208. The base 208 can be affixed to rear or aft deck of a personal watercraft such as by a marine grade adhesive, bolts/screw, or an equivalent.

At the top 212 of the main body 202 is another attachment feature 214 that is configured to couple with a standard camera attachment 216 by mating with corresponding attachment feature 218 of the camera attachment 216. The camera attachment is mechanically configured conform with a standard camera mounting arrangement, such as, for example that described in ISO 1222:2010 (International Standards Organization, also known as the International Organization for Standardization), and commonly used for camera tripods and other mounts. The attachment features 214, 218 allow the tilt angle of the camera attachment 216 to be adjusted to a desired angle.

A collar 222 can fit over the main body 202 to connect with the extension arm 220, and allow height adjustment of the position on the main body to conform to the various dimensions of personal watercraft. The extension arm can include an attachment feature 224 that mates with a corresponding attachment feature 226 on the collar 222. In some embodiments the collar 222 can be integrally formed as part of the extension arm, rather than having them be separate components. Opposite from the collar 222 on the distal end of the extension arm 220 is an attachment 228 that is configured to hold the extension arm 220 to the rear seat handle of a personal watercraft. The attachment 228 can be a strap using hook and loop retention, a clamp, a hook, or an equivalent structure. In some embodiments the attachment 228 can be a moveable clamp feature that can move along the axis of the extension arm 220 and hold the rear seat handle between the clamp and the end of the extension arm.

Accordingly, the camera mount system 200, in some embodiments, can have multiple ways that it can be adjusted. The height over the operator/driver and passenger, the angle of the camera, and the position fore-aft can all accommodate various camera configurations and view preferences to achieve a desired view for recording video while using a personal watercraft. Furthermore, these adjustable features can accommodate a variety of personal watercraft design and still allow the camera mount system 200 to be adjusted to a preferred view of the camera.

To mount the camera mount system 200 on a personal watercraft, then, the base 208 is installed on the rear deck of the personal watercraft. This can be accomplished using an adhesive, or by fasteners such as bolts (which require appropriate sealed holes to be made). In some embodiments the bottom of the base 208 can be provided with an adhesive layer covered by a peel-off release liner, and upon peeling off the release liner the base 208 can be adhered to a suitably prepared surface on the rear deck of the personal watercraft. The main body 202 can then be attached to the base 208 at the base attachment feature 206. In some embodiments a collar 222 can be placed over the top of the main body 202 and lowered to a position approximately where there extension arm 220 is located. The camera attachment 216 can be attached to the attachment feature 218, and a camera can be mounted on the camera mount 216. The extension arm can then be coupled to the main body 202, either directly or to a collar 222. And then the attachment 228 at the distal end of the extension arm 220 can then be coupled or attached to the rear seat handle of the personal watercraft.

Figure 3:
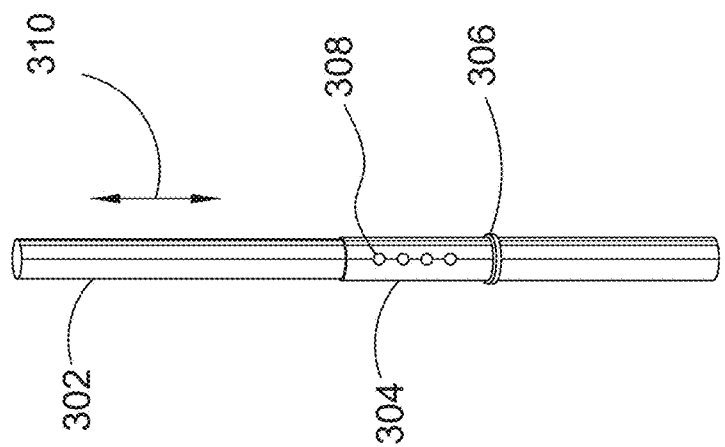
FIG. 3 is a detailed view of a main member of a camera mount system, in accordance with some embodiments.

FIG. 3 is a detailed view of a main member 300 of a camera mount system, in accordance with some embodiments. The main member 300 shown here provides an example of one way in which height adjustment can be accomplished. The main member 300 is substantially the equivalent of the main body or elongated member previously described, and can include an upper portion 302 and a lower portion 304 in which the upper portion fits in a coaxial (e.g. telescoping) arrangement. Thus, the upper portion 302 can be moved in the direction of arrow 310 along the common axis of the upper portion 302 and the lower portion 304. The lower portion 304 can have a series of holes 308 into which a sprung pin in the upper portion 302 that is inside the lower portion 304 can be biased to hold the upper and power portions 302, 304 together relative to each other. The sprung pin has a diameter slightly smaller than a diameter of the holes 308, in is urged outward from a side of the upper portion 302 through a similar hole, but is retained in the upper portion. Thus, to adjust the height of the camera, a user can depress the sprung pin to allow the upper and lower portions 302, 304 move to a desired overall height, at which point the sprung pin will pop though a corresponding hole 308. In addition, in some embodiment, and collar stop 306 is a raised component of the lower portion 304 on which a collar for connecting to an extension arm can rest.

Figure 4:
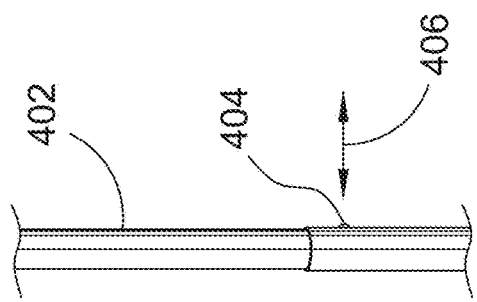
FIG. 4 is a detailed view of a section of a main member that allows adjustment of the length of the main member, in accordance with some embodiments.

FIG. 4 is a detailed view of a section of a main member 400 that allows adjustment of the length of the main member, in accordance with some embodiments. The main member 400 can be substantially similar to main member 300 of FIG. 3, and includes an upper portion 402 that include a sprung pin 404 that moves in the direction of arrow 406. A spring inside the upper portion 402 urges the spring pin 404 outwards, though an opening in the side of the upper portion 402. A rim on the inside end of the spring pin creates an interference that prevents the sprung pin 404 from being pushed out of the upper portion 402 by the spring. The upper portion 402 can fit into a lower portion (e.g. 304) in a telescoping, sliding arrangement, where the upper portion 402 can be moved such that the sprung pin 404 passes through one of several openings in the lower portion. Thus, the arrangement of FIGS. 3-4 allows discrete height adjustment based on the location of the holes (308) in the lower portion. Furthermore, it will be appreciated by those skilled in the art that the configurations of the upper and lower portions can be reversed. That is, the upper portion can have the holes, and the lower portion can include a sprung pin for selectively engaging one of the holes to achieve the desired height.

Figure 5:
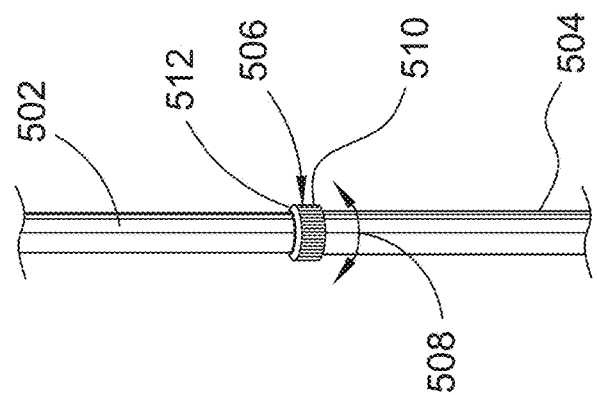
FIG. 5 is a detailed view of a main member of a camera mount system, in accordance with some embodiments.

FIG. 5 is a detailed view of a main member 500 of a camera mount system, in accordance with some embodiments. Whereas the arrangement of FIGS. 3-4 allow for discrete height adjustment, the main member 500 allows for a continuous range of height adjustment. An upper portion 502 fits, coaxially, into a lower portion 504 in a telescoping arrangement. A compression coupler 506 includes an adjustment ring 510 and a compression member 512 inside the adjustment ring 510, between the adjustment ring 510 and the upper portion 502. The compression member 512 is attached to, or integrally formed with, the lower portion 504. The adjustment ring has thread on the inside surface that mate with threads in the outside surface of the compression member 512. The upper portion of the compression member 512 can flare outward such that when the adjustment ring 510 is turned, as indicated by arrow 508, upwards, the adjustment ring compresses the compression member 512 against the outside surface of the upper portion 502, thereby creating sufficient static friction to hold the upper portion 502 in place relative to the lower portion 504. It will be appreciated by those skilled in the art that the extension arm (e.g. 116) can be lengthwise-adjustable using the same arrangements as used to make the main body height-adjustable in FIGS. 3-5.

Figure 6:
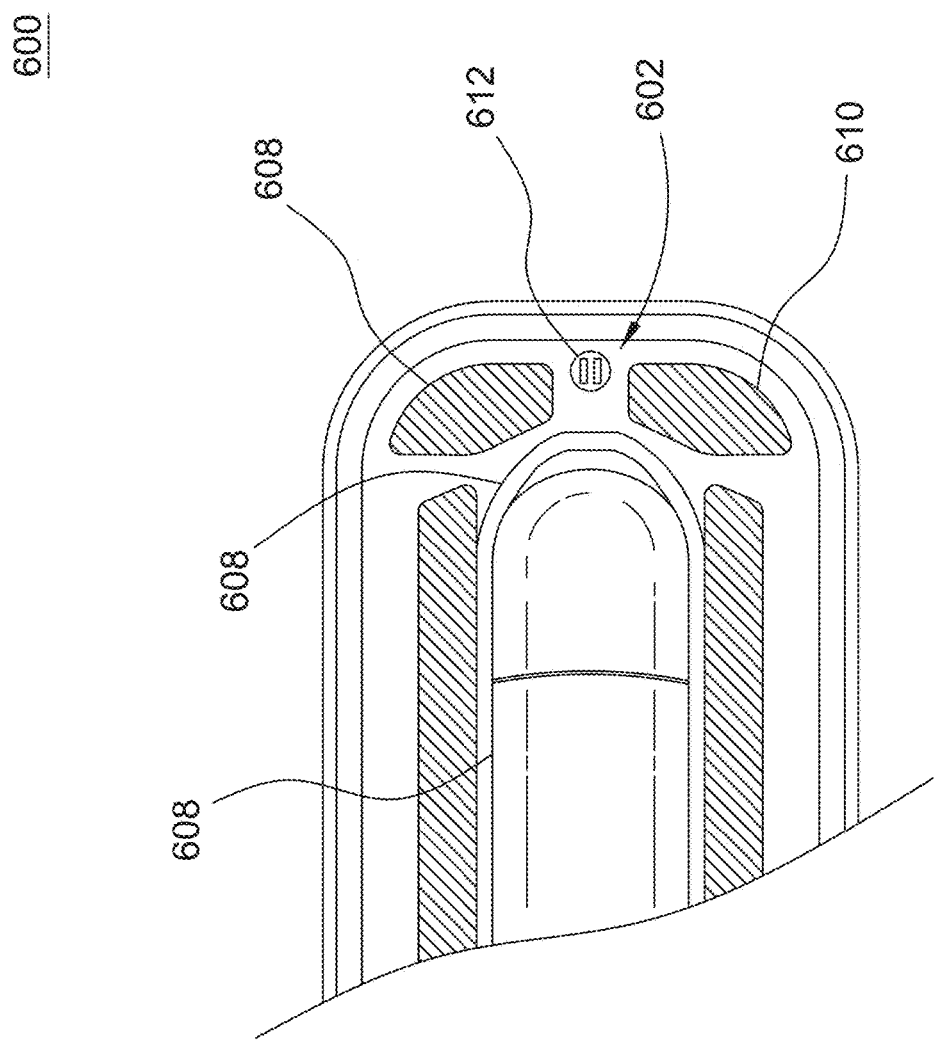
FIG. 6 is a top view of the rear portion of a personal water craft and a base for a camera mount system, in accordance with some embodiments.

FIG. 6 is a top view of the rear portion 600 of a personal water craft and a base for a camera mount system, in accordance with some embodiments. The rear portion 600 includes the aft or rear deck 602. Forward of the aft deck 602 is a seat 604 for one or two people. A rear seat handle 606 extends around the back of the seat 604, at about seat height, to allow a person to hang onto the handle 606. The aft deck 602 is at a level below the top of the seat 604 (the surface on which a person sits), and can be used to step onto or to carry items. In some cases the top surface of the aft deck 602 can include skid resistant panels 608, 610 on which people can step, and which have an abrasive surface texture that provide friction against wet skin (e.g. the bottom of feet) or footwear. On many personal watercraft the panels 608, 610 have a space between them, exposing the top surface of the aft deck 602 along the mid-line of the personal watercraft. A base 612 can be affixed to the top surface of the aft deck on this mid line, between panels 608, 610. The base 612 can be similar to base 106 of FIG. 1, and is configured to couple to the main member of the camera mount. The base 612 can be held in place with adhesive, a suction cup, or fasteners (e.g. bolts). In some embodiments the panels 608, 610 are not separated, forming one panel that spans the width of the top surface of the aft deck 602. In those cases, fasteners may be preferred over adhesive attachment of the base to the aft deck 602.

Figure 7:
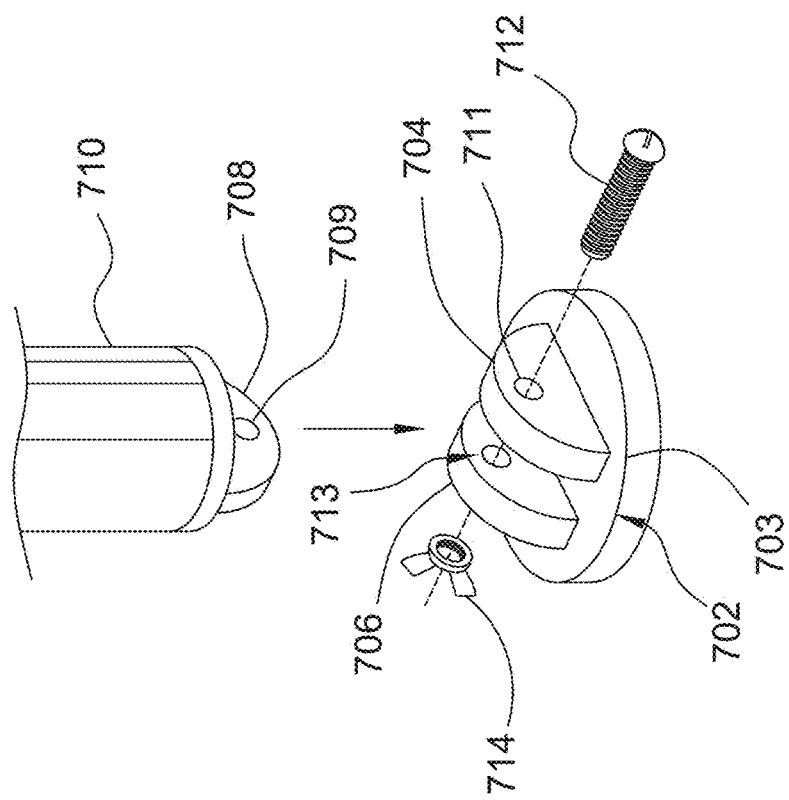
FIG. 7 is an exploded view of one configuration of a base for a camera mount system, in accordance with some embodiments.

FIG. 7 is an exploded view 700 of one configuration of a base 702 for a camera mount system, in accordance with some embodiments. The base 702 can be substantially similar to base 106 of FIG. 1, and includes a generally flat portion 703. On the top of the flat portion 703 are two semi-circular protrusions 704, 706, defining a space between them into which an attachment feature 708 at the bottom of a lower portion 710 of the main body of the camera mount can fit. The attachment feature 708 includes a hole 709 that can be aligned with holes 711, 713 in the protrusions 704, 706 to allow a bolt 712 to pass through. A wing nut 714 can be threaded onto the bolt 712 to hold the bolt 712 in place, thereby holding the main body to the base in a way that allows the main body to pivot about the axis of the bolt 712. The base 702 must therefore be arranged and coupled to the aft deck such that the space between the protrusions 704, 706 is aligned, axially, with the axis (from front to rear) of the personal watercraft, as shown, for example, on base 612 of FIG. 6.

Figure 8:
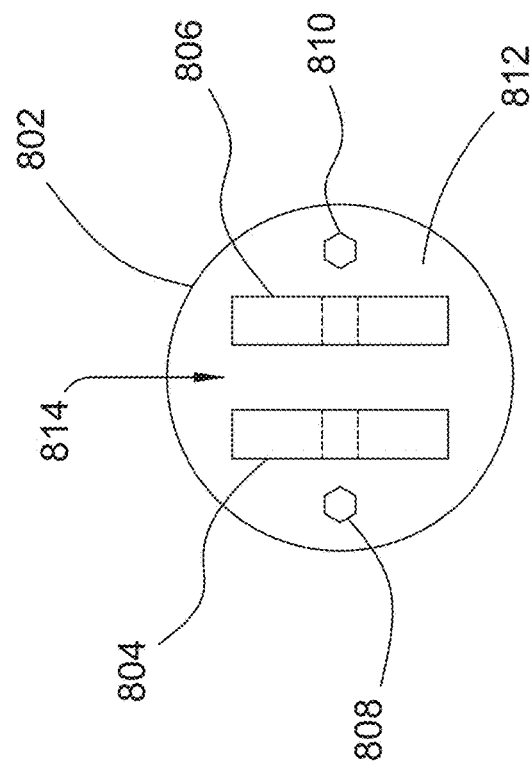
FIG. 8 is a top view of a base for use in a camera mount system, in accordance with some embodiments.

FIG. 8 is a top view of a base 800 for use in a camera mount system, in accordance with some embodiments. The base 800 includes a flat portion 802 having a flat bottom surface, which is not in view from this angle, that mates with the top surface of the aft deck of a personal watercraft. On the top 812 of the flat portion 802 are two semi-circular protrusions 804, 806 that extend upward from the top 812, defining a space 814 between the protrusions 804, 806 to receive a similar semi-circular attachment feature (e.g. 206) at the bottom of the main body of the camera mount. In some embodiments the base can be mounted on the top surface of the aft deck using adhesive, or alternatively using fasteners such as bolts 808, 810 that pass through the base and through the top surface of the aft deck, assuming the bolts don't interfere with any components of the personal watercraft.

Figure 9:
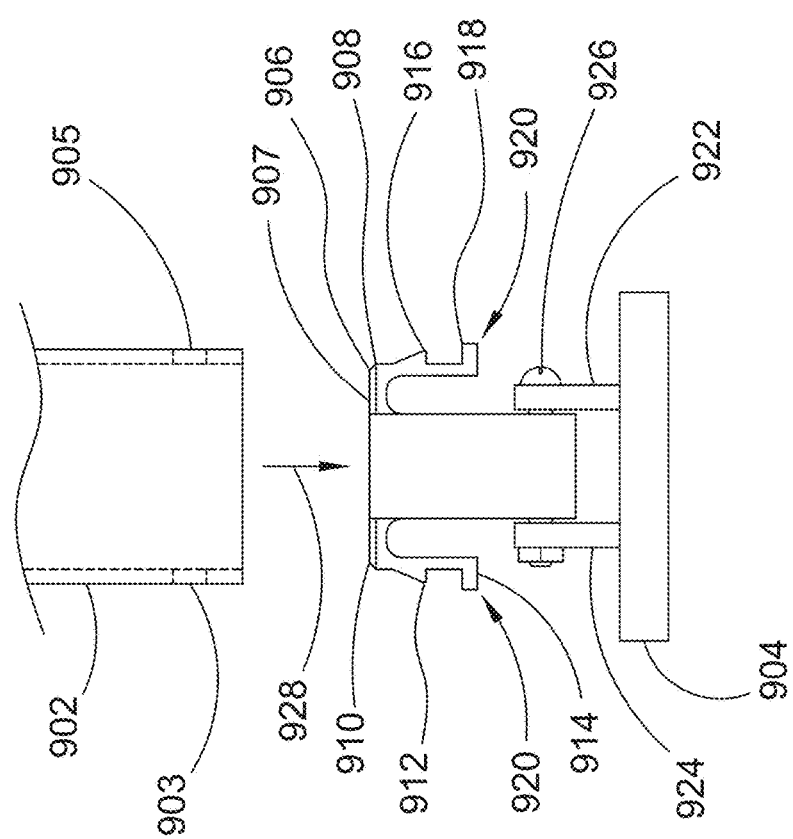
FIG. 9 is a side view of a base for use in a camera mount system, in accordance with some embodiments.

FIG. 9 is a side view of a base 904 for use in a camera mount system 900, in accordance with some embodiments. The base 904 engages and retains the main body 902 of an elongated member (e.g. 110 of FIG. 1) as an alternative arrangement to that of FIGS. 7-8. The main body 902 is hollow at the bottom, and can include two transverse openings 903, 905 through the wall of the main body 902. The main body 902 extends upward to a top where a camera mount is located, and can be placed over a retention portion 907 of the base 904 on the top of the base 904. The retention portion 907 can pivot around a pivot pin 926 that passes thought the retention portion and raised protrusions 922, 924 that can be substantially similar to protrusions 804, 806 of FIG. 8. The retention portion 907 can extend upward away from the base 904. At the top 906 of the retention portion 907 there are two deflectable retention members 908, 910 which extend downward alongside the retention portion 907, and spaced a distance away from the outside of the retention portion 907. Further, the retention members 908, 910 are cantilevered, and can be deflected but are spring-like, and resist being deflected.

As the main body 902 is lowered over the retention portion 907 in the direction of arrow 928, the inside walls (in dashed line) of the main body 902 pass over the top 906 and meet ramps 912, 916, causing the retention member 908, 910 to deflect inwards to allow the main body to pass over the ramps 912, 916 until the ramps 912, 916 engage holes 903, 905 allowing the retention member 908, 910 to spread outwards such that the ramps 912, 916 are then in engagement with the holes 903, 905. The bottom of the main body is prevented from traveling downward further by transverse extensions 914, 918 which extend outward. The transverse extensions 914, 918 also allow a user to remove the main body from the retention member 908, 910 upon a user pressing the transverse members 914, 918 inwards to cause the ramps 912, 916 to be clear of the edges of the holes 903, 905, and thereby allowing the user to pull up on the main body to remove it from the base 904. Accordingly, the retention member 907 allows the user to secure the main body 902 to the base 904 for use, and then to remove the main body 902 from the base 904 when the camera mount is not needed.

Figure 10:
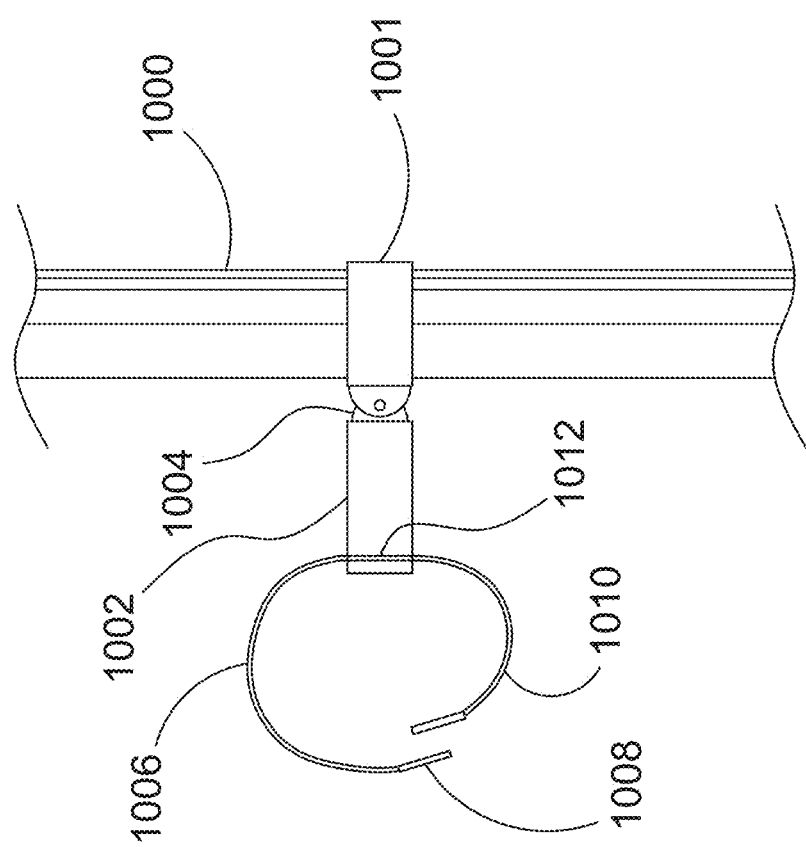
FIG. 10 is a side view of an extension arm of a camera mount system, in accordance with some embodiments.

FIG. 10 is a side view of an extension arm of a camera mount system, in accordance with some embodiments. The main body 1000 of the camera mount system extends vertically from a base, and includes a top at which a camera can be mounted. The extension arm 1002 couples between a side of the main body 1000 and the rear seat handle of the personal watercraft. The extension arm 1002 can be attached to the main body 1000 by a pivoting attachment feature 1004 that uses interlocking flanges or protrusions, or by a collar 1001 as shown and described in reference to FIG. 2. The collar 1001 can encircle and fit over the main body 1000, and the interlocking flanges can be provided on an outside of the collar 1001, rather than on a side of the main body 1000 as in some embodiments. The distal end of the extension arm 1002 can attach to the rear seat handle of the personal watercraft using, for example a strap 1006 that has corresponding hook 1008 and loop 1010 portions that fasten together. A portion 1012 of the strap 1006 can pass through the distal end of the extension arm 1002. Thus, once the main body 1000 is mounted on the base on the aft deck of the personal watercraft, the strap 1006 can be wrapped around the rear seat handle of the personal watercraft and closed, placing the hook and loop portions 1008, 1010 together to hold the extension arm to the rear seat handle.

Figure 11:
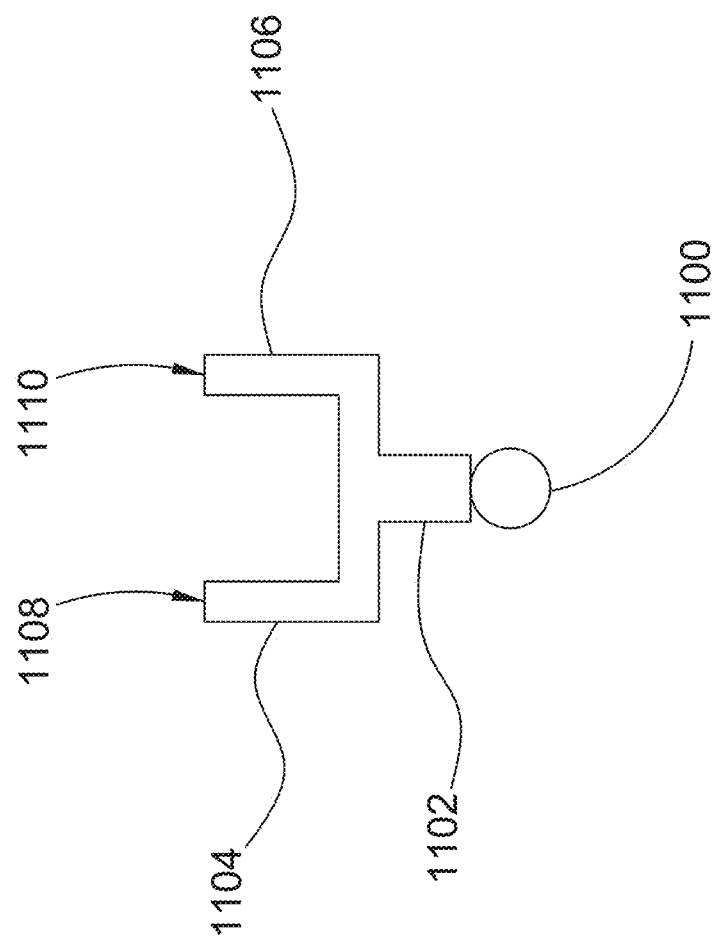
FIG. 11 shows a top view bifurcated extension arm for use with a camera mount system, in accordance with some embodiments.

FIG. 11 shows a top view bifurcated extension arm for use with a camera mount system, in accordance with some embodiments. A main body 1100 is shown in cross section looking down from the top. The extension arm 1102 includes a first portion 1104 and a second portion 1106 in a fork arrangement. Each of the portions 1104, 1106 have a respective strap or clamp 1108, 1110 that are configured to attach to the rear seat handle of the personal watercraft. By providing the two "tine" portions 1104, 1106, the side to side stability of the camera mount system is improved over using just a straight extension arm with one point of contact to the rear seat handle.

Figure 12:
FIG. 12 is a photograph example of an image captured using a prior art camera mount on the body of a rider or at the front of a personal watercraft.
Figure 13:
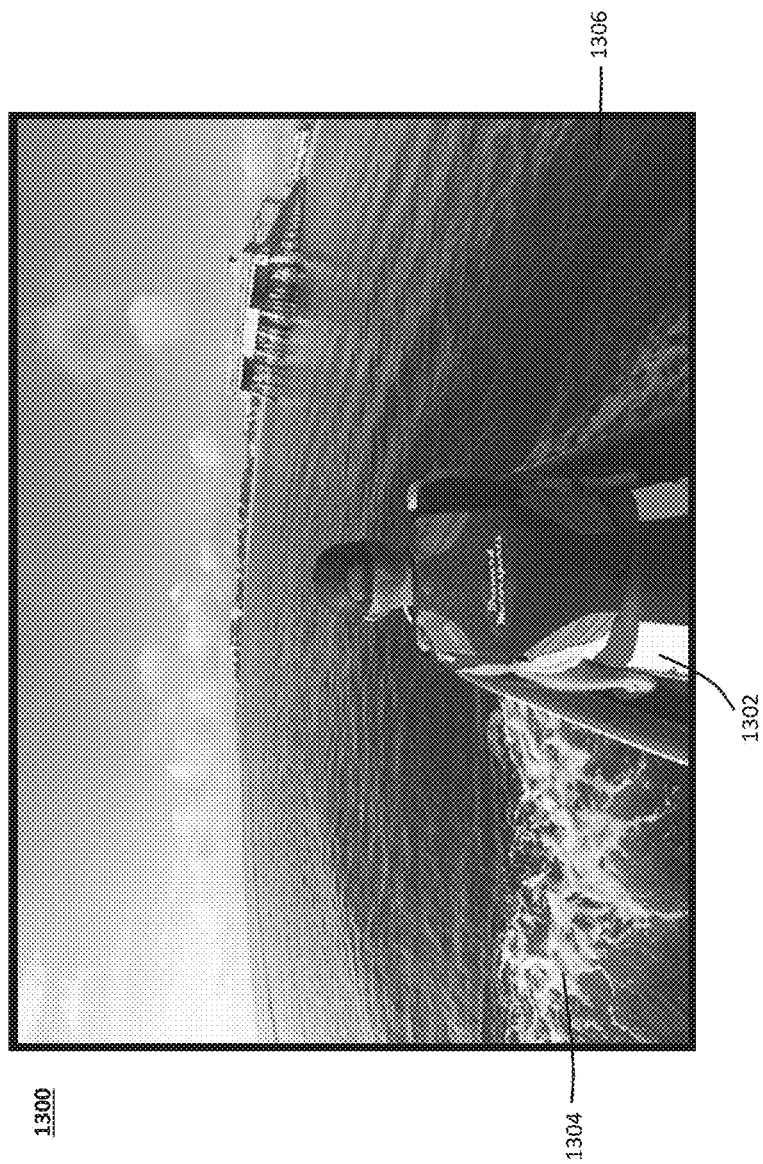
FIG. 13 is a photograph example of an image captured using a camera mount system for a personal watercraft, in accordance with embodiments of the inventive disclosure.

FIGS. 12 and 13 compare two images captured by a camera using different camera mounts. FIG. 12 is a photograph example of an image 1200 captured using a prior art camera mount on the body of a rider or at the front of a personal watercraft. FIG. 13 is a photograph example of an image 1300 captured using a camera mount system for a personal watercraft, in accordance with embodiments of the inventive disclosure. In FIG. 12, the front of the personal watercraft 1202 occupies a substantial area of the image. The rider/driver is not in view, and the lower left side 1204 and lower right side 1206 of the image 1200 are filled with portions of the personal watercraft 1202. Because the camera mounted to the watercraft 1202, or to the person riding the watercraft 1202, the area of the image occupied by the watercraft 1202 is substantially static. That is, while video is being recorded, nothing in the region of the image 1200 occupied by the watercraft 1202 is changing, even during video recording. Furthermore, the rider/driver is not in view, so their response and actions cannot be seen. In FIG. 13, the image 1300 was captured using a camera mount system designed and mounted in accordance with the inventive disclosure herein. A personal watercraft 1302, including a rider/driver, is in view. The lower left side 1304 and lower right side 1306 are not filled with static subject matter, but rather those portions show subject matter not coupled to or part of the watercraft 1302. When recording video using the inventive camera mount system, the sense of movement of the watercraft 1302 will be enhanced over that of the prior art camera mount used to produce image 1200 because motion in the near field will be evident in image 1300, whereas the watercraft 1202 prevents that in image 1200. Further, the human rider/driver is in view and occupies a major portion of the watercraft region in the image 1300, allowing the view to see the person's actions and responses to operating the watercraft 1300, making for a more interesting viewing experience. It is believed that people would often rather watch video and/or look at images that include other people they know, or even people they do not know, over a similar video or image that does not include people.

A camera mount system for a personal watercraft has been disclosed that allows a user to record video from a unique position on the personal watercraft to optimize the recorded view. The disclosed camera mount uses an elongated member that is based on the aft or rear deck, or otherwise behind the seat of the personal watercraft, and which elevates the camera attachment above the head of the rider(s). An extension arm connects the elongated member to the handle behind the seat to stabilize the elongated member while operating the personal watercraft. The resulting position of the camera allows a view of the rider(s), as well as the view in front of the personal watercraft, rather than a view from the rider's perspective which results in a significant portion of the view being blocked by controls and other portions of the personal watercraft. Using the disclosed camera mount, more of the image field will be occupied by region in front of the personal watercraft, and the rider will also be in view, which is considered to be more interesting than taking up a significant portion of the image with the forward portion of the personal watercraft, which tends to be static and uninteresting.

What is claimed is:

1. A camera mount system for a personal watercraft, comprising:
   a main body comprising an elongated member having a length of at least three feet, and further having a top end and a bottom end wherein the top end is configured to receive a camera attachment;
   a base having a flat bottom surface configured to adhere to a deck surface of the personal watercraft, and further having a top that is configured to couple to the bottom end of the elongated member of the main body in a way that allows rotation of the elongated member about a coupling point between the base and the elongated member; and
   an extension arm that extends from the main body having a distal end, the distal end having an attachment configured to attach to a rear seat handle of the personal water craft.

2. The camera mount system of claim 1, wherein the elongated member comprises an upper section and a lower section that move relative to each other in a telescoping manner, and which includes a holding feature to hold the upper and lower sections in place at a selected length of the main body.

3. The camera mount system of claim 2, wherein the holding feature comprises a compression collar.

4. The camera mount system of claim 2 wherein the holding feature comprises sprung peg that extends through openings in both the upper and lower sections and which can be compressed against a spring that urges the sprung peg outward to move the upper and lower sections relative to each other.

5. The camera mount system of claim 1, wherein the length of the main body is adjustable to increase the length by at least four inches.

6. The camera mount system of claim 1, wherein the attachment at the distal end of the extension arm comprises a clamp.

7. The camera mount system of claim 1, wherein the attachment at the distal end of the extension arm comprises a hook and loop fastener strap.

8. The camera mount system of claim 1, further comprising a collar that encircles and fits over the main body, and wherein the extension arm is adjustable in length and is coupled to the collar.

9. The camera mount system of claim 1, wherein the top of the base comprises at least two attachment points to couple the top to the bottom of the elongated member.

10. The camera mount system of claim 1, wherein the top end of the main body is further configured to adjust an angle of the camera attachment.

11. A camera mount system for a personal watercraft, comprising: a main body having a top end and a bottom end wherein the top end is configured to receives camera attachment, the main body being an elongated structure comprised of two telescoping members that can be moved relative to each other and locked into position at a selected length; a base having a bottom surface configured to interface with an aft deck surface of the personal watercraft, behind a seat of the personal watercraft, and further having a top that is configured to couple to the bottom end of the main body in a way that allows rotation of the main body about a coupling point between the base and the elongated member; and an extension arm that extends from the main body at a proximate end of the extension arm, the extension arm having a distal end having an attachment configured to attach to a rear seat handle of the personal watercraft behind the seat of the personal watercraft, and wherein the extension arm is length adjustable.

12. The camera mount system of claim 11, wherein the main body comprises:
    an upper section and a lower section that move relative to each other; and
    a holding feature to hold the upper and lower sections in place at the selected length of the main body.

13. The camera mount system of claim 12, wherein the holding feature comprises a compression collar.

14. The camera mount system of claim 12 wherein the holding feature comprises sprung peg that extends through openings in both the upper and lower sections and which can be compressed against a spring that urges the sprung peg outward to move the upper and lower sections relative to each other.

15. The camera mount system of claim 11, wherein the length of the main body is adjustable to vary a length of the main body by at least four inches.

16. The camera mount system of claim 11, wherein the attachment at the distal end of the extension arm comprises a clamp.

17. The camera mount system of claim 11, wherein the attachment at the distal end of the extension arm comprises a hook and loop fastener strap.

18. The camera mount system of claim 11, wherein the extension arm is adjustable in length by at least two inches between a minimum fixed length and a maximum fixed length.

19. The camera mount system of claim 11, wherein bottom of the main body couples to the base at a retention portion that is pivotably mounted between two protrusion that extend upward from a top surface of the base, and wherein the retention member includes retention portions extending from a top of the retention portion downward along a side of the retention portion, and wherein the retention members are cantilevered and include a transverse extension that extends outward horizontally and a ramp portion between the transverse extension and the top of the retention portion, and wherein upon placing the bottom end of the main body over the retention portion, an inside surface of the main body compresses the retention members inward by interference with the ramp portion of each retention member, unit a respective opening in the bottom end of the main body is aligned with the ramp portions thereby allowing the retention members to displace outward, and wherein the transverse extensions prevent the bottom end of the main body from traveling further downward, and wherein the retention members are configured to allow removal of the main body from the retention portion by compressing the transverse extensions inward to compress the retention members such that the ramp portions are clear of the openings in the bottom end of the main body.

20. The camera mount system of claim 1, wherein the top end of the main body is further configured to adjust an angle of the camera attachment.

\* \* \* \* \*